US011581146B2

United States Patent
Kang et al.

(10) Patent No.: US 11,581,146 B2
(45) Date of Patent: Feb. 14, 2023

(54) CERAMIC ELECTRONIC COMPONENT COMPRISING DIELECTRIC GRAINS HAVING A CORE-DUAL SHELL STRUCTURE AND METHOD OF MANUFACTURING THE SAME

(71) Applicant: SAMSUNG ELECTRO-MECHANICS CO., LTD., Suwon-si (KR)

(72) Inventors: Sung Hyung Kang, Suwon-si (KR); Jong Hyun Cho, Suwon-si (KR); Min Sung Song, Suwon-si (KR); Il Ho An, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 60 days.

(21) Appl. No.: 17/085,309

(22) Filed: Oct. 30, 2020

(65) Prior Publication Data

US 2021/0249192 A1    Aug. 12, 2021

(30) Foreign Application Priority Data

Feb. 7, 2020   (KR) .................. 10-2020-0014955

(51) Int. Cl.
*H01G 4/30* (2006.01)
*H01G 4/012* (2006.01)
(Continued)

(52) U.S. Cl.
CPC ........... *H01G 4/30* (2013.01); *C04B 35/4682* (2013.01); *H01G 4/012* (2013.01); *H01G 4/1209* (2013.01);
(Continued)

(58) Field of Classification Search
CPC ........ H01G 4/30; H01G 4/012; H01G 4/1209; H01G 4/1227; H01G 4/1245; H01G 13/00;
(Continued)

(56) References Cited

U.S. PATENT DOCUMENTS 5,225,960 A * 7/1993 Kishi ................... H01G 4/1245
                                                  29/25.42
8,164,880 B2   4/2012 Kang et al.
(Continued)

FOREIGN PATENT DOCUMENTS

JP    2001-240466 A    9/2001
JP    2006-298746 A    11/2006
(Continued)

*Primary Examiner* — David M Sinclair
*Assistant Examiner* — Daniel M Dubuisson
(74) *Attorney, Agent, or Firm* — Morgan, Lewis & Bockius LLP (57) ABSTRACT

A ceramic electronic component includes a body, including a dielectric layer and an internal electrode. The dielectric layer includes a plurality of dielectric grains, and at least one of the plurality of dielectric grains has a core-dual shell structure having a core and a dual shell. The dual shell includes a first shell, surrounding at least a portion of the core, and a second shell, surrounding at least a portion of the first shell. The dual shell includes different types of rare earth elements R1 and R2, and $R2_{S1}/R1_{S1}$ is 0.01 or less and $R2_{S2}/R1_{S1}$ is 0.5 to 3.0, where $R1_{S1}$ and $R1_{S2}$ denote concentrations of R1 included in the first shell and the second shell, respectively, and $R2_{S1}$ and $R2_{S2}$ denote concentrations of R2 included in the first shell and the second shell, respectively.

16 Claims, 8 Drawing Sheets

(51) Int. Cl.
*H01G 4/12* (2006.01)
*C04B 35/468* (2006.01)

(52) U.S. Cl.
CPC ....... *H01G 4/1227* (2013.01); *C04B 2235/65* (2013.01)

(58) Field of Classification Search
CPC .. H01G 13/006; H01G 4/232; C04B 35/4682; C04B 2235/65; C04B 35/62685; C04B 35/62807; C04B 35/62815; C04B 2235/3206; C04B 2235/3208; C04B 2235/3215; C04B 2235/3217; C04B 2235/3224; C04B 2235/3225; C04B 2235/3227; C04B 2235/3229; C04B 2235/3236; C04B 2235/3241; C04B 2235/3244; C04B 2235/3262; C04B 2235/3293; C04B 2235/3418; C04B 35/465; C04B 2235/75; C04B 35/49; C04B 35/62894
See application file for complete search history.

(56) References Cited

U.S. PATENT DOCUMENTS

| | | | |
|---|---|---|---|
| 8,638,544 | B2 | 1/2014 | Yoon et al. |
| 9,076,578 | B2 | 7/2015 | Kang et al. |
| 9,190,209 | B2 | 11/2015 | Kang et al. |
| 2001/0021095 | A1 | 9/2001 | Mizuno et al. |
| 2006/0216512 | A1 | 9/2006 | Fujikawa et al. |
| 2009/0225494 | A1* | 9/2009 | Yamazaki ......... C04B 35/62815 156/89.14 |
| 2009/0310279 | A1 | 12/2009 | Sasabayashi et al. |
| 2012/0057271 | A1* | 3/2012 | Oh ........................ C03C 14/004 977/831 |
| 2016/0155570 | A1 | 6/2016 | Shimada et al. |

FOREIGN PATENT DOCUMENTS

| | | |
|---|---|---|
| JP | 2010-024126 A | 2/2010 |
| JP | 2013129560 A * | 7/2013 |
| KR | 10-2009-0105972 A | 10/2009 |
| KR | 10-2016-0065012 A | 6/2016 |

* cited by examiner

CERAMIC ELECTRONIC COMPONENT COMPRISING DIELECTRIC GRAINS HAVING A CORE-DUAL SHELL STRUCTURE AND METHOD OF MANUFACTURING THE SAME

CROSS-REFERENCE TO RELATED APPLICATION(S)

This application claims the benefit under 35 USC 119 (a) of Korean Patent Application No. 10-2020-0014955 filed on Feb. 7, 2020 in the Korean Intellectual Property Office, the entire disclosure of which is incorporated herein by reference for all purposes.

BACKGROUND

1. Field

The present disclosure relates to a ceramic electronic component and a method of manufacturing the same.

2. Description of Related Art

In general, a ceramic electronic component using a ceramic material such as a capacitor, an inductor, a piezoelectric element, a varistor, a thermistor, or the like may include a ceramic body formed of the ceramic material, an internal electrode disposed in the ceramic body, and an external electrode disposed on a surface of the ceramic body to be connected to the internal electrode.

Multilayer ceramic capacitors (MLCCs), a type of ceramic electronic component, are being developed to have increasing capacitance through the ultra-thinning of layers thereof.

A high-capacitance multilayer ceramic capacitor (MLCC) may include barium titanate ($BaTiO_3$) as a main material to form a body, and nickel as a base material of the internal electrode.

Such a body is generally sintered in a reduction atmosphere. In this case, the dielectric therein should be resistant to the reduction.

However, due to the inherent characteristics of the oxide, oxygen in the oxide may escape during the sintering operation in the reduction atmosphere to generate oxygen vacancies and electrons. Therefore, reliability and insulation resistance (IR) thereof may be deteriorated.

To address the above issue, a method has been proposed in which a rare earth element such as Dy, Y, Ho, or the like is added to suppress the generation of the oxygen vacancies, to reduce mobility of oxygen vacancies, and to remove electrons generated by the addition of a transition metal.

However, there remains an issue that the above method may be not effective when layers in the multilayer ceramic capacitor are thinned to have a relatively high capacitance or when a relatively high voltage is used therein under more severe use environments.

In addition, when the rare earth element or the transition element is added in the above method, high-temperature lifespan characteristics may be deteriorated or a temperature coefficient of capacitance (TCC) characteristic, depending on a change in temperature, may be deteriorated.

SUMMARY

An aspect of the present disclosure is to provide a ceramic electronic component and a method of manufacturing the same, capable of improving reliability.

An aspect of the present disclosure is to provide a ceramic electronic component and a method of manufacturing the same, capable of improving high-temperature lifespan characteristics.

An aspect of the present disclosure is to provide a ceramic electronic component and a method of manufacturing the same, capable of improving temperature coefficient of capacitance (TCC) characteristics.

However, the objects of the present disclosure are not limited to the above description, and will be more easily understood in the process of describing specific embodiments of the present disclosure.

According to an aspect of the present disclosure, a ceramic electronic component includes a body, including a dielectric layer and an internal electrode, and an external electrode disposed on the body and connected to the internal electrode. The dielectric layer includes a plurality of dielectric grains, and at least one of the plurality of dielectric grains has a core-dual shell structure having a core and a dual shell. The dual shell includes a first shell, surrounding at least a portion of the core, and a second shell, surrounding at least a portion of the first shell. The dual shell includes two different types of rare earth elements R1 and R2, and $R2_{S1}/R1_{S1}$ is 0.01 or less and $R2_{S2}/R1_{S1}$ is 0.5 to 3.0, where $R1_{S1}$ and $R1_{S2}$ denote concentrations of R1 included in the first shell and the second shell, respectively, and $R2_{S1}$ and $R2_{S2}$ denote concentrations of R2 included in the first shell and the second shell, respectively.

According to an aspect of the present disclosure, a method of manufacturing a ceramic electronic component having a core-dual shell structure having a core and a dual shell in the dielectric layer includes preparing a base material powder having a core-shell structure having a core and a shell, wherein the shell includes a rare earth element R1, adding a minor component including a rare earth element R2, which is different from the rare earth element R1, to the base material powder to prepare a ceramic green sheet, printing a conductive paste for an internal electrode on the ceramic green sheet, and then laminating the printed ceramic green sheet to prepare a laminate, sintering the laminate to prepare a body including a dielectric layer and an internal electrode, and forming an external electrode on the body. A content of R2 is 0.1 to 3.0 times a content of R1.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

A value used to describe a parameter such as a 1-D dimension of an element including, but not limited to, "length," "width," "thickness," diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, portions not related to the description will be omitted for clarification of the present disclosure, and a thickness may be enlarged to clearly show layers and regions. Further, throughout the specification, when an element is referred to as "comprising" or "including" an element, it means that the element may further include other elements as well, without departing from the description, unless specifically stated otherwise.

In the drawings, an X direction may be defined as a second direction, an L direction, or a longitudinal direction; a Y direction may be defined as a third direction, a W direction, or a width direction; and a Z direction may be defined as a first direction, a stacking direction, a T direction, or a thickness direction.

Ceramic Electronic Component

Figure 1:
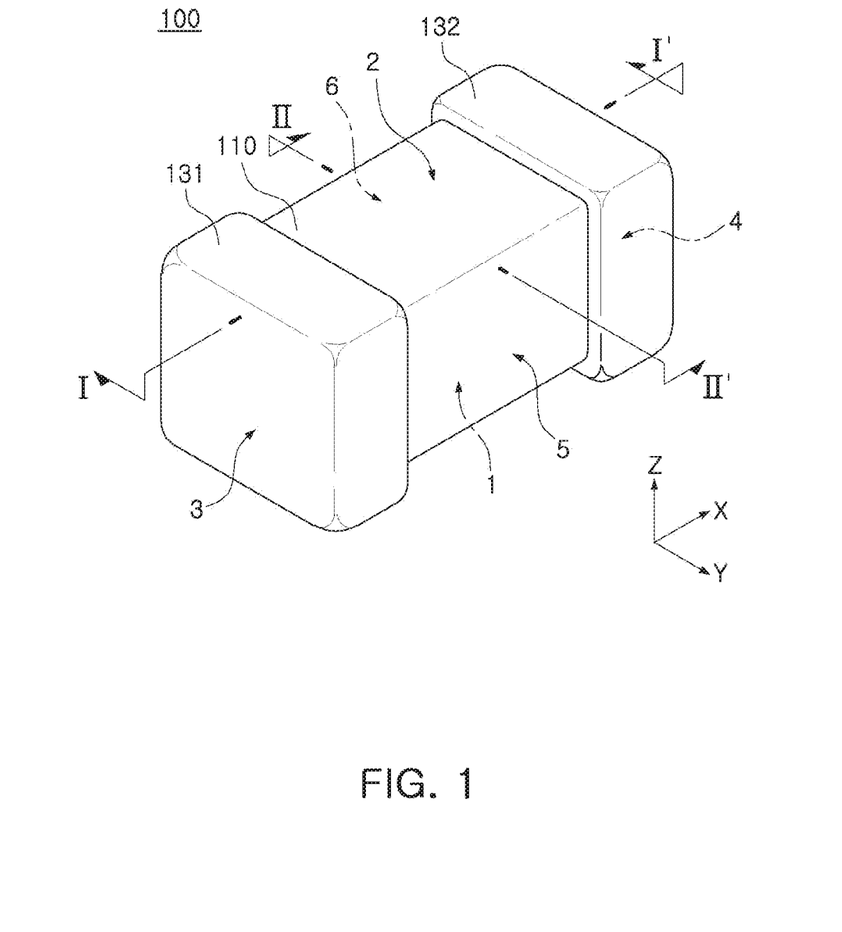
FIG. 1 is a schematic perspective view illustrating a ceramic electronic component according to an embodiment of the present disclosure.

FIG. 1 is a schematic perspective view illustrating a ceramic electronic component according to an embodiment of the present disclosure.

Figure 2:
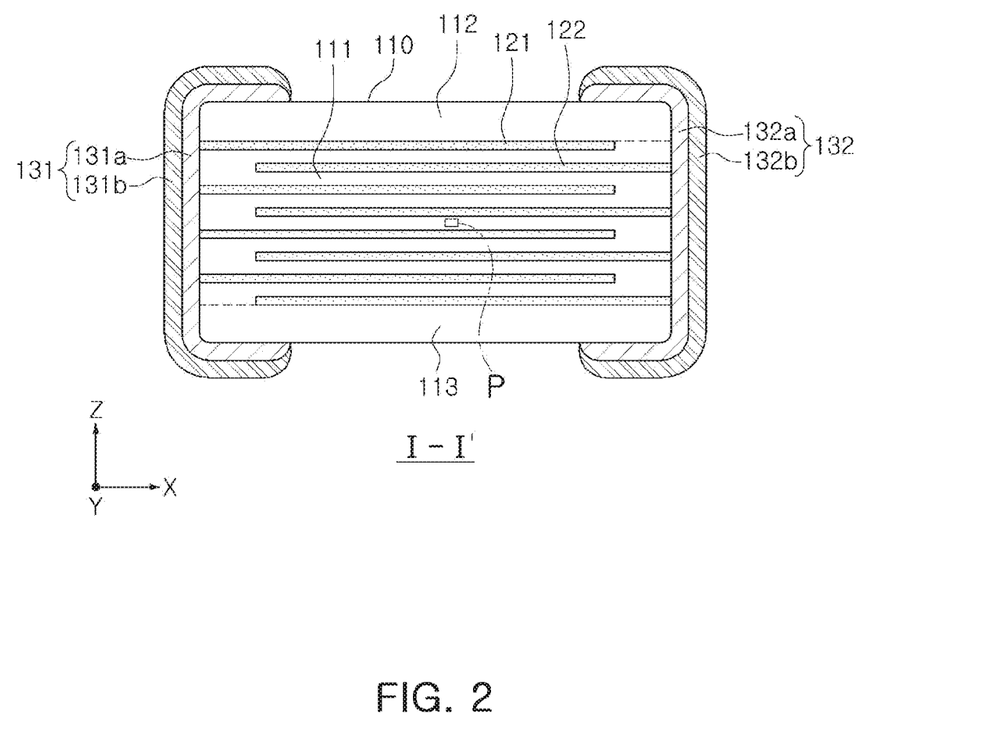
FIG. 2 is a schematic cross-sectional view taken along line I-I' in FIG. 1.

FIG. 2 is a schematic cross-sectional view taken along line I-I' in FIG. 1.

Figure 3:
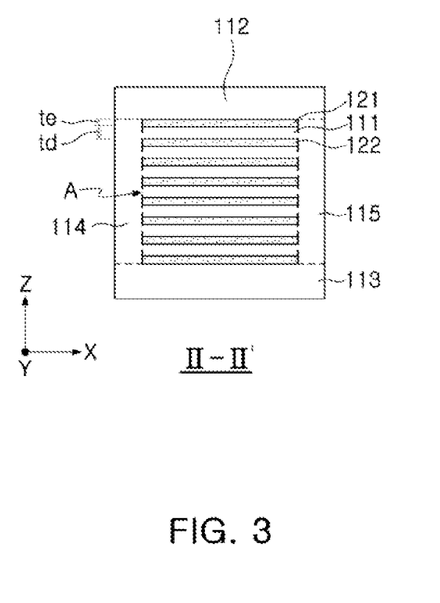
FIG. 3 is a schematic cross-sectional view taken along line II-II' of FIG. 1.

FIG. 3 is a schematic cross-sectional view taken along line II-II' of FIG. 1.

Figure 4:
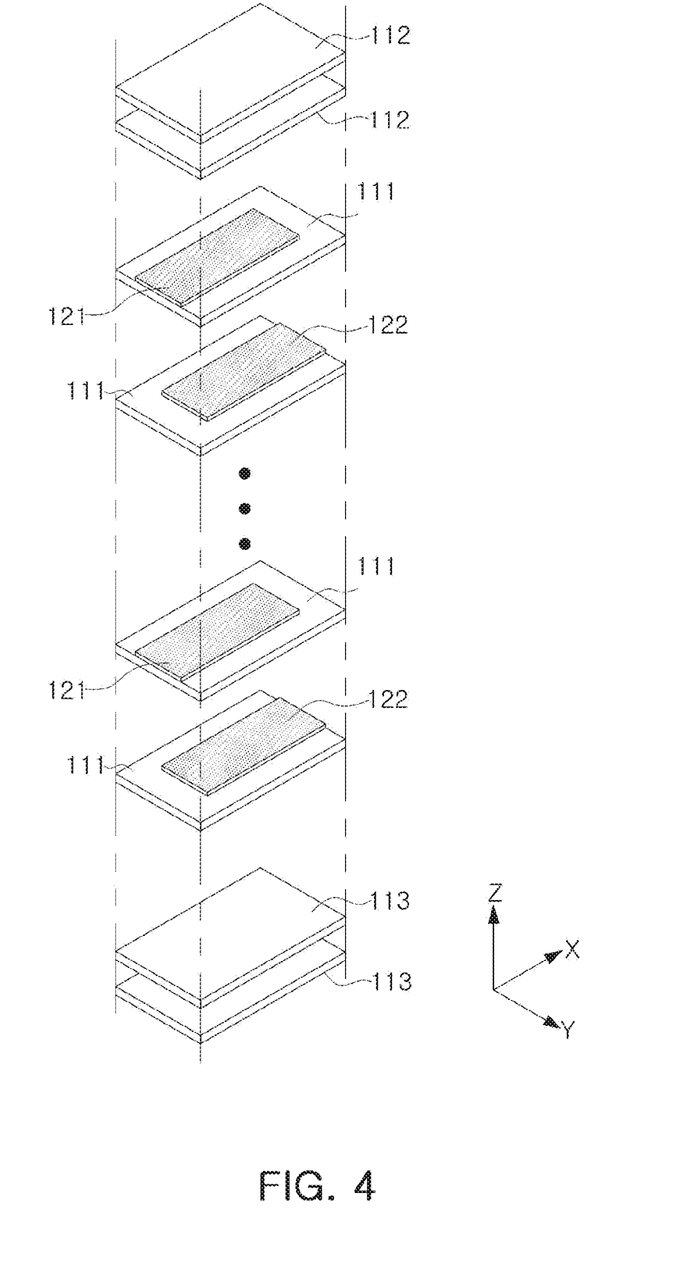
FIG. 4 is a schematic exploded perspective view illustrating a body in which a dielectric layer and an internal electrode are stacked, according to an embodiment of the present disclosure.

FIG. 4 is a schematic exploded perspective view illustrating a body in which a dielectric layer and an internal electrode are stacked, according to an embodiment of the present disclosure.

Figure 5:
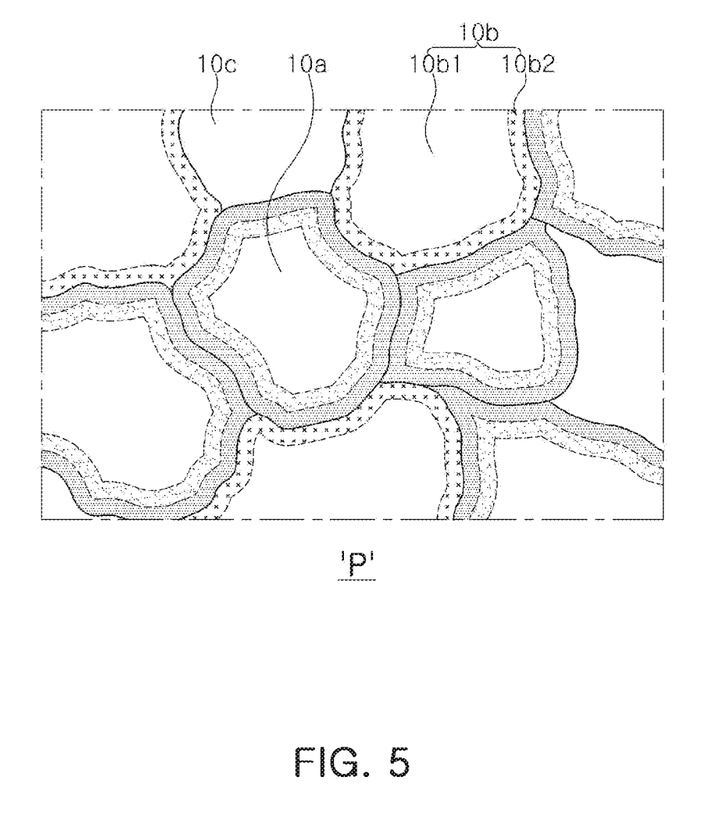
FIG. 5 is an enlarged view of region P of FIG. 2.

FIG. 5 is an enlarged view of region P of FIG. 2.

Figure 6:
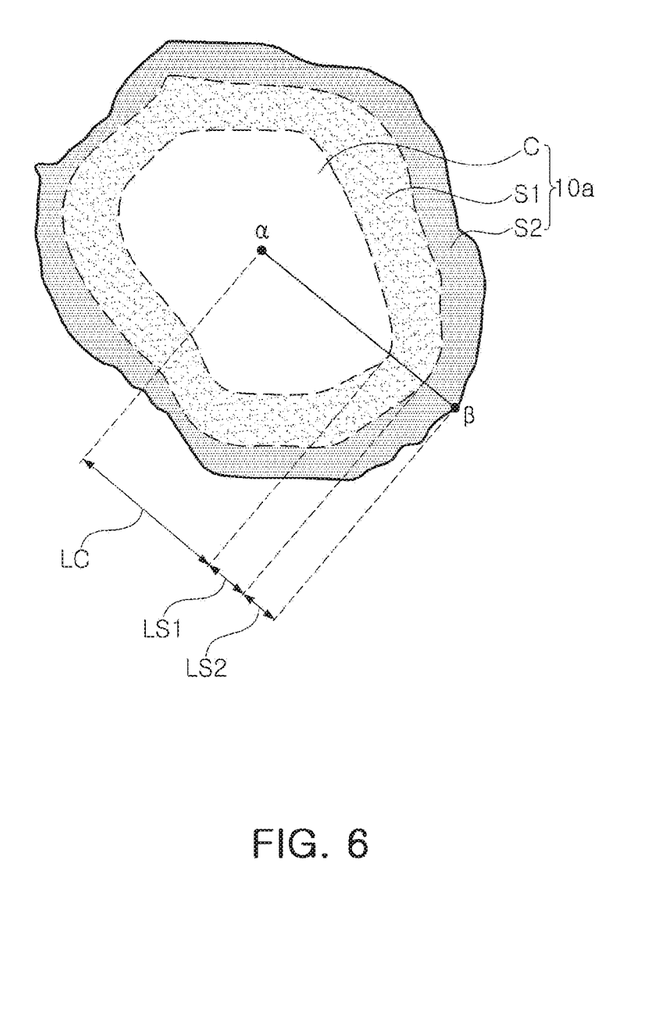
FIG. 6 is a schematic diagram illustrating a grain having a core-dual shell structure.

FIG. 6 is a schematic diagram illustrating a grain having a core-dual shell structure.

Hereinafter, a ceramic electronic component 100 according to an embodiment of the present disclosure will be described in detail with reference to FIGS. 1 to 6. Also, a multilayer ceramic capacitor will be described as an example of a ceramic electronic component, but the present disclosure is not limited thereto. In addition, a ceramic electronic component using a ceramic material such as a capacitor, an inductor, a piezoelectric element, a varistor, a thermistor, or the like may be also applied.

A ceramic electronic component 100 according to the embodiment includes a body 110, including a dielectric layer 111 and an internal electrode 121 or 122, and an external electrode 131 or 132 disposed on the body 110 and connected to the internal electrode 121 or 122. The dielectric layer 111 includes a plurality of dielectric grains 10a, 10b, and 10c. At least one of the plurality of dielectric grains 10a, 10b, and 10c has a core-dual shell structure having a core C and a dual shell. The dual shell includes a first shell S1, surrounding at least a portion of the core C, and a second shell S2 surrounding at least a portion of the first shell S1. The dual shell includes different types of rare earth elements R1 and R2, and $R2_{S1}/R1_{S1}$ is 0.01 or less and $R2_{S2}/R1_{S1}$ is 0.5 to 3.0, where $R1_{S1}$ and $R1_{S2}$ denote concentrations of R1 included in the first shell and the second shell, respectively, and $R2_{S1}$ and $R2_{S2}$ denote concentrations of R2 included in the first shell and the second shell, respectively. The concentrations of the rare earth elements R1 and R2 included in the first shell and the second shell may be measured using the XRF EDS line analysis. The intensity of the rare earth elements R1 and R2 detected using the XRF EDS line analysis may be used to calculate $R2_{S1}/R1_{S1}$ and $R2_{S2}/R1_{S1}$. $R2_{S1}/R1_{S1}$ and $R2_{S2}/R1_{S1}$ are a ratio of mole.

In the body 110, a plurality of dielectric layers 111 may be alternately stacked with the internal electrode 121 or 122.

Although a specific shape of the body 110 is not necessarily limited, as illustrated, the body 110 may have a hexahedral shape or the like. Due to shrinkage of ceramic powder particles contained in the body 110 during a sintering process, the body 110 may not have a perfectly hexahedral shape with completely straight lines, but may have a substantially hexahedral shape overall.

The body 110 may have first and second surfaces 1 and 2 opposing each other in a thickness direction (the Z direction), third and fourth surfaces 3 and 4 connected to the first and second surfaces 1 and 2 and opposing each other in a length direction (the X direction), and fifth and sixth surfaces 5 and 6 connected to the first and second surfaces 1 and 2, connected to the third and fourth surfaces 3 and 4, and opposing each other in a width direction (the Y direction).

A plurality of dielectric layers 111 forming the body 110 may be in a sintered state, and adjacent dielectric layers 111 may be integrated with each other such that boundaries therebetween are not readily apparent without using a scanning electron microscope (SEM).

Referring to FIG. 5, each dielectric layer 111 may include a plurality of dielectric grains including 10a, 10b, and 10c, and at least one of the plurality of dielectric grains may be a dielectric grain 10a having a core-dual shell structure.

Referring to FIG. 6, the dielectric grain 10a having the core-dual shell structure may include a first shell S1 surrounding at least a portion of a core C, and a second shell S2 surrounding at least a portion of the first shell S1.

Referring to FIG. 6, the dielectric grain 10a having the core-dual shell structure may include a first shell S1, surrounding at least a portion of a core C, and a second shell S2 surrounding at least a portion of the first shell S1.

Development of multilayer ceramic capacitors (MLCC), as an example of a common ceramic electronic component, has focused on increasing capacitance and ultra-thinning of layers of MLCCs.

With the increase in capacitance and the ultra-thinning in layers, it has become increasing difficult to secure withstand voltage characteristics of a dielectric layer in the multilayer ceramic capacitor, and an increase in a defect rate caused by deterioration of insulation resistance of a dielectric layer has emerged as an issue.

To address the above issues, a method in which a rare earth element such as Dy, Y, Ho, or the like, is added to suppress the generation of oxygen vacancies, to reduce mobility of the oxygen vacancies, and to remove electrons generated by the addition of a transition metal, has been proposed.

However, when layers in the multilayer ceramic capacitor are thinned to have higher capacitance or when a high voltage is used therein under more severe use environments, there have still been issues which cannot be addressed by the above method.

Therefore, in the present disclosure, at least one of the plurality of dielectric grains has a core-dual shell structure. In the core-dual shell structure, a ratio of a concentration of a rare earth element included in the first shell and a concentration of a rare earth element included in the second shell may be controlled to secure better high temperature lifespan characteristics and temperature coefficient of capacitance (TCC) characteristics.

Therefore, in the present disclosure, at least one of the plurality of dielectric grains has a core-dual shell structure. In the core-dual shell structure, a dual shell may include different types of rare earth elements R1 and R2, and R2 may almost not be included in the first shell. In addition, a ratio of a concentration of R1 included in the first shell and a concentration of R2 included in the second shell may be controlled to secure high-temperature lifespan characteristics and TCC characteristics.

A rare earth element may basically replace an A site having a perovskite structure, represented by $ABO_3$, such that an oxygen vacancy concentration is reduced to forma cell region. The shell region may act as a barrier to prevent electrons from flowing at grain boundaries of dielectric grains, to prevent the leakage current.

As illustrated in FIGS. 5 and 6, the first shell S1 may be disposed to cover an entire surface of the core C, and the second shell S2 may be disposed to cover an entire surface of the first shell S2. However, the first shell S1 may not cover a portion of a surface of the core C, and the second shell S2 may be directly deposited on the portion of the surface of the core C where the first shell S1 is not covered. Also, the second shell S2 may not cover a portion of a surface of the first shell S1.

In this case, the first shell S1 may be disposed to cover at least 90 area % of the surface of the core C, and the second shell S2 may be disposed to cover at least 90 area % of the surface of the first shell S1. This is because when the first shell S1 is disposed to cover less than 90 area % of the surface of the core and/or the second shell S2 is disposed to cover less than 90 area % of the surface of the first shell S1, the effect of improving reliability according to the present disclosure may not be sufficient.

The dual shell includes different types of rare earth elements R1 and R2. A concentration of R1 included in the first shell S1 may be defined as $R1_{S1}$, a concentration of R1 included in the second shell S2 may be defined as $R1_{S2}$, a concentration of R2 included in the first shell S1 may be defined as $R2_{S1}$, and a concentration of R2 included in the second shell S2 may be defined as $R2_{S2}$.

A ratio of the concentration of R2 included in the first shell S1 to the concentration of R1 included in the first shell S1 ($R2_{S1}/R1_{S1}$) is 0.01 or less (including 0). For example, R2 is substantially not included in the first shell S1. When $R2_{S1}/R1_{S1}$ is greater than 0.01, the effect of improving reliability according to the present disclosure may not be sufficient.

In addition, a ratio of the concentration of R2 included in the first shell S2 to the concentration of R1 included in the first shell S1 ($R2_{S2}/R1_{S1}$) satisfies 0.5 to 3.0.

When $R2_{S2}/R1_{S1}$ is less than 0.5, the effect of improving reliability according to the present disclosure may not be sufficient. When $R2_{S1}/R1_{S1}$ is greater than 3.0, a secondary phase may be formed by a rare earth element to deteriorate reliability.

When $R2_{S2}/R1_{S1}$ satisfies 0.5 to 3.0, a ratio of the concentration of R1 included in the second shell S2 to the concentration of R1 included in the first shell S1 ($R1_{S2}/R1_{S1}$) may satisfy 0.1 to 1.3.

When $R1_{S2}/R1_{S1}$ is less than 0.1, abnormal grain growth may be induced, and thus, coarse grains may be formed to deteriorate reliability. Meanwhile, when $R1_{S2}/R1_{S1}$ is greater than 1.3, a secondary phase may be formed by a rare earth element to deteriorate reliability.

In the core C, no rare earth element may be included or a significantly small amount of rare earth element may be included.

In addition, since the concentration of R1 or R2 dramatically changes at a boundary between the core C and the first shell S1 and dramatically changes at a boundary between the first shell S1 and the second shell S2, the core C, the first shell S1, and the second shell S2 may be easily distinguished, and may be confirmed through Transmission Electron Microscopy Energy Dispersive Spectroscopy (TEM-EDS) analysis.

Referring to FIG. 6, a distance LS2 corresponding to the thickness of the second shell S2 along a straight line connecting α and β may be greater than 4% to less than 25% of a distance between α and β, where α denotes a center of the core-dual shell structure in the cross-section of the core-dual shell structure, and β denotes a point on an outer surface of the second shell, farthest from α. In this case, α may refer to a center of gravity of the dielectric grain in a cross-section. The distances LS2 is measured using TEM-EDS. The distance LS2 can be measured by a method other than the TEM-EDS method, which is appreciated by the one skilled in the art.

When the distance LS2 corresponding to the thickness of the second shell S2 along the straight line connecting α and R is 4% or less, the effect of improving reliability may not be sufficient, and the effect of improving high-temperature lifespan characteristics and the dielectric constant may be deteriorated.

Meanwhile, when the distance LS2 corresponding to the thickness of the second shell along the straight line connecting α and β is 25% or more, the high temperature lifespan characteristics may be deteriorated or the temperature coefficient of capacitance (TCC) characteristics depending on a change in temperature may be deteriorated.

In this case, a distance LS1 corresponding to the thickness of the first shell S1 along the straight line connecting α and β may be 5% or more to 30% or less of the distance between α and β.

When the distance LS1 corresponding to a thickness of the first shell S1 along the straight lines connecting α and β is less than 5%, it may be difficult to implement a dual shell structure. When the distance LS1 corresponding to a thickness of the first shell S1 along the straight lines connecting α and β exceeds 30%, it may be difficult to secure reliability.

The distances LS1 is measured using TEM-EDS. The distance LS1 can be measured by a method other than the TEM-EDS method, which is appreciated by the one skilled in the art.

In addition, when a length of the first shell S1 is quite different from a length of the second shell S2, it may be difficult to simultaneously improve the high-temperature lifespan characteristics and the TCC characteristics. Therefore, the length LS1 corresponding to a thickness of the first shell, among the straight lines connecting α and β, may be 0.5 to 1.5 times the length LS2 corresponding to a thickness of the second shell S2, among the straight lines connecting α and β.

Referring to FIG. 5, the dielectric layer 111 may include a dielectric grain 10b having a core-shell structure, in addition to the dielectric grain 10a having the core-dual shell structure. Therefore, at least one or more of a plurality of dielectric grains may be the dielectric grain 10b having the core-shell structure. The dielectric grain 10b having the core-shell structure may include a core 10b1 and a shell 10b2 surrounding at least a portion of the core 10b1.

In addition, the dielectric layer 111 may include a dielectric grain 10c having no shell.

When the dielectric layer 111 includes the dielectric grain 10c having no shell, the number of the dielectric grains 10a having the core-dual shell structure may be 50% or more with respect to the total number of the dielectric grains including 10a, 10b, and 10c. A ratio of the number of dielectric grains having the core-dual shell structure may be measured in an image of a cross-section of the dielectric layer scanned by a transmission electron microscope (TEM).

When the number of the dielectric grains having the core-dual shell structure, among the plurality of dielectric grains, is less than 50%, the effect of improving high temperature lifespan characteristics and the TCC characteristic may be not sufficient.

The dielectric layer 111 may include a material having a perovskite structure represented by $ABO_3$ as a main component.

For example, the dielectric layer 111 may include one or more of $BaTiO_3$, (Ba,Ca) (Ti,Ca)$O_3$, (Ba,Ca) (Ti,Zr)$O_3$, Ba (Ti,Zr)$O_3$, or (Ba,Ca) (Ti,Sn)$O_3$ as a main component.

More specifically, for example, the dielectric layer 111 may include one or more selected from the group consisting of $BaTiO_3$, $(Ba_{1-x}Ca_x)$ $(Ti_{1-y}Ca_y)O_3$ (where $0 \le x \le 0.3$, $0 \le y \le 0.1$), $(Ba_{1-x}Ca_x)$ $(Ti_{1-y}Zr_y)O_3$ (where $0 \le x \le 0.3$, $0 \le y \le 0.5$), Ba $(Ti_{1-y}Zr_y)O_3$ (where $0 < y \le 0.5$), or $(Ba_{1-x}Ca_x)$ $(Ti_{1-y}Sn_y)O_3$ (where $0 \le x \le 0.3$, $0 \le y \le 0.1$), as main components.

A sum of contents of R1 and R2 included in the dielectric layer 111 may be in a range of 0.1 to 15 moles, relative to 100 moles of the main component.

When the sum of the contents of R1 and R2 included in the dielectric layer 111 is less than 0.1 mole, relative to 100 moles of the main component, it may be difficult to implement the core-dual shell structure. When the sum of the contents of R1 and R2 included in the dielectric layer 111 is greater than 15 moles, relative to 100 moles of the main component, the sintering temperature may be significantly increased. Therefore, it may be difficult to obtain a dense microstructure.

The content of each of R1 and R2 included in the dielectric layer 111 is not necessarily limited. However, in one embodiment of the present disclosure, the content of R1 included in the dielectric layer 111 may be 0.1 to 4.0 moles, relative to 100 moles of the main component, and the content of R2 included in the dielectric layer 111 may be 0.01 to 12 moles, relative to 100 moles of the main component. In further detail, the content of R1 included in the dielectric layer 111 may be 0.1 to 2.5 moles, relative to 100 moles of the main component, and the content of R2 included in the dielectric layer 111 may be 0.01 to 7.5 moles, relative to 100 moles of the main component.

In this case, R1 may be at least one selected from the group consisting of lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or ruthenium (Ru), and R2 may be at least one selected from the group, which is not the element included in R1.

In addition, the present disclosure is not limited thereto. However, the element selected from the group, which is included in R2, has a larger ionic radius than the element selected from the group included in R1. This is because when the element included in R2 has a larger ionic radius than the element included in R1, there may be an effect of more easily implementing a core-double shell structure according to the present disclosure.

In addition, minor components included in the dielectric layer 111 do not need to be limited except that rare earth elements should be included in the dielectric layer 111, and appropriate elements and contents may be determined to obtain desired characteristics. For example, the dielectric layer may further include at least one of Mn, Cr, Ba, Si, Al, Mg, or Zr, as a minor component.

A size of the dielectric grains is not necessarily limited. For example, an average grain size of the dielectric grains in the dielectric layer 111 may be 50 nm or more to 500 nm or less. The size of the average grain size can be measured by a method other than the Feret diameter method, which is appreciated by the one skilled in the art.

When an average grain size is less than 50 nm, an expected effect depending on deficiency in dissolution of an added element, caused by a decrease in dielectric constant and a decrease in grain growth rate, may be insufficient. When the average grain size is greater than 500 nm, a change in capacitance depending on a temperature and a DC voltage may be increased and reliability may be deteriorated due to a decrease in the number of dielectric grains per unit volume of dielectric layer.

The body 110 may include a capacitance formation portion A disposed in the body 110 and including a first internal electrode 121 and a second internal electrode 122 disposed to oppose each other with respective dielectric layers 111 interposed therebetween, to form capacitance and cover portions 112 and 113, respectively formed above and below the capacitance formation portion A.

In addition, the capacitance formation portion A may be a portion contributing to capacitance formation of a capacitor, and may be formed by repeatedly and alternately laminating the plurality of first and second internal electrodes 121 and 122 with respective dielectric layers 111 interposed therebetween.

An upper cover portion 112 and a lower cover portion 113 may be formed by laminating a single dielectric layer or two or more dielectric layers on upper and lower surfaces of the capacitance formation portion in a vertical direction, respectively, and may basically serve to physical or chemical damage to prevent the internal electrodes 121 and 122 from being damaged by external physical or chemical stress.

The upper cover portion 112 and the lower cover portion 113 may not include internal electrodes, and may include the same material as the dielectric layer 111.

For example, the upper cover portion 112 and the lower cover portion 113 may include a ceramic material, for example, may include a barium titanate ($BaTiO_3$)-based ceramic material.

In addition, margin portions 114 and 115 may be disposed on side surfaces of the capacitance formation portion A.

The margin portions 114 and 115 may be disposed on the sixth surface 6 of the body 110, and a margin portion 115 may be disposed on the fifth surface 5 of the body 110. For example, the margin portions 114 and 115 may be disposed on both side surfaces of the body 110 opposing each other in the width direction.

As illustrated in FIG. 3, the margin portions 114 and 115 may refer to a region between ends of the first and second internal electrodes 121 and 122, in the cross-section of the body 110 cut in width-thickness (W-T) directions, and a boundary surface of the body 110.

The margin portions 114 and 115 may basically serve to prevent damage to the internal electrode due to external physical or chemical stress.

The margin portions 114 and 115 may be formed by applying a conductive paste to a ceramic green sheet at a region in which a margin portion is to be formed.

To suppress a step formed by the internal electrodes 121 and 122, after a lamination operation, the internal electrodes may be cut to be exposed from the fifth and sixth surfaces 5 and 6 of the body 110. Then, a single dielectric layer or two or more dielectric layers may be laminated on both exposed surfaces of the capacitance formation portion A in the width direction to form the margin portions 114 and 115.

The internal electrodes 121 and 122 may be alternately laminated with the dielectric layer 111.

The internal electrodes 121 and 122 may include first internal electrode(s) 121 and second internal electrode(s) 122. The first and second internal electrodes 121 and 122 may be alternately arranged to oppose each other with respective dielectric layers 111, constituting the body 110, interposed therebetween, and may respectively be exposed to the third and fourth surfaces 3 and 4 of the body 110.

Referring to FIG. 2, the first internal electrode(s) 121 may be spaced apart from the fourth surface 4 and may be exposed from the third surface 3, and the second internal electrode(s) 122 may be spaced apart from the third surface 3 and may be exposed from the fourth surface 4.

In this case, the first and second internal electrodes 121 and 122 may be electrically separated from each other by respective dielectric layers 111 interposed therebetween.

Referring to FIG. 3, the body 110 may be formed by alternately laminating a ceramic green sheet, on which the first internal electrode 121 is printed, and a ceramic green sheet, on which the second internal electrode 122 is printed, and then sintering the laminated ceramic green sheet laminate.

A material for forming the internal electrodes 121 and 122 is not necessarily limited, and a material having improved electrical conductivity may be used. For example, the internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti), and alloys thereof, on the ceramic green sheet.

A screen-printing method, a gravure printing method, or the like, may be used as a printing method of the conductive paste for the internal electrodes, but the present disclosure is not limited thereto.

To achieve miniaturization and high capacitance of the multilayer ceramic capacitor, thicknesses of the dielectric layer(s) and the internal electrode(s) should be thinned to increase the number of laminated layers. Therefore, as the dielectric layer(s) and the internal electrode(s) are thinned, reliability may be deteriorated, and characteristics such as an insulation resistance, breakdown voltage, or the like, may be deteriorated.

Therefore, as the dielectric layer(s) and the internal electrode(s) are thinned, the effect of improving reliability according to the present disclosure may be improved.

In particular, when a thickness (te) of the internal electrode 121 and 122 or a thickness (td) of the dielectric layer(s) 111 is 0.41 μm or less, the effect of improving high-temperature lifespan characteristics and the TCC characteristics according to the present disclosure may be significantly improved.

The thickness (te) of the internal electrodes 121 and 122 may refer to an average thickness of the first and second internal electrodes 121 and 122.

The thickness (te) of the internal electrodes 121 and 122 may be measured by scanning an image of a cross-section in the third and first directions (an L-T cross-section) of the body 110 by a scanning electron microscope (SEM).

For example, on the basis of a reference internal electrode layer at a point at which a center line in the longitudinal direction of the body and a center line in the thickness direction of the body meet, a thickness (te) of the internal electrodes 121 and 122 may be determined by defining two points to the left and two points to the right from a reference center point in the reference internal electrode layer at equal intervals, measuring a thickness of each of the defined points, and obtaining an average value therefrom, for five internal electrode layers including the reference internal electrode layer, and two upper internal electrode layers and two lower internal electrode layers, respectively arranged on and below the reference internal electrode layer, among the internal electrode layers extracted from an image of a cross-section in the third and first directions (an L-T cross-section) of the body 110, cut in a central portion of the body 110 in the width direction, scanned by a scanning electron microscope (SEM).

For example, since a thickness at the reference center point in the reference internal electrode layer at a point at which a center line in the longitudinal direction of the body and a center line in the thickness direction of the body meet, and a thickness (each 500 nm) at each of the two points to the left and right from the reference center point at equal intervals, for the above five internal electrode layers, may be measured, the thickness (te) of the internal electrodes 121 and 122 may be determined as an average value of the thicknesses of a total of 25 points.

The thickness (td) of the dielectric layer 111 may refer to an average thickness of the dielectric layer(s) 111 disposed between the first and second internal electrodes 121 and 122.

Similarly to the thickness (te) of the internal electrode, the thickness (td) of the dielectric layer 111 may be measured by scanning an image of a cross-section in the third and first directions (an L-T cross-section) of the body 110 by a scanning electron microscope (SEM).

For example, on the basis of a reference dielectric layer at a point at which a center line in the longitudinal direction of the body and a center line in the thickness direction of the body meet, a thickness (td) of the dielectric layer 111 may be determined by defining two points to the left and two points to the right from a reference center point in the reference dielectric layer at equal intervals, measuring a thickness of each of the defined points, and obtaining an average value therefrom, for five dielectric layers including the reference dielectric layer, and two upper dielectric layers and two lower dielectric layers, respectively arranged on and below the reference dielectric layer, among the dielectric layers extracted from an image of a cross-section in the third and first directions (an L-T cross-section) of the body 110, cut in a central portion of the body 110 in the width direction, scanned by a scanning electron microscope (SEM).

For example, since a thickness at the reference center point in the reference dielectric layer at a point at which a center line in the longitudinal direction of the body and a center line in the thickness direction of the body meet, and a thickness (each 500 nm) at each of the two points to the left and right from the reference center point at equal intervals, for the above five dielectric layers, may be measured, the thickness (td) of the dielectric layer 111 may be determined as an average value of the thicknesses of a total of 25 points.

The external electrodes 131 and 132 may be arranged on the body 110, and may be connected to the internal electrodes 121 and 122, respectively.

As illustrated in FIG. 2, first and second external electrodes 131 and 132 may be disposed on the third and fourth surfaces 3 and 4 of the body 110, respectively, and may be connected to the first and second internal electrodes 121 and 122, respectively.

In this embodiment, a structure in which the ceramic electronic component 100 has two external electrodes 131 and 132 has been described, but the number, shape, and the like of the external electrodes 131 and 132 may be changed, depending on shapes of the internal electrodes 121 and 122, or other purposes.

The external electrodes 131 and 132 may be formed using any material as long as they have electrical conductivity such as metal, a specific material may be determined in consideration of electrical characteristics, structural stability, and the like, and may have a multilayer structure.

For example, the external electrodes 131 and 132 may include electrode layers 131a and 132a, and plating layers 131b and 132b formed on the electrode layers 131a and 132a, respectively.

As a more specific example of the electrode layers 131a and 132a, the electrode layers 131a and 132a may be sintered electrodes including a conductive metal and a glass, or resin-based electrodes including a conductive metal and a resin.

In addition, the electrode layers 131a and 132a may have a form in which the sintered electrode and the resin-based electrode are sequentially formed on the body 110. In addition, the electrode layers 131a and 132a may be formed by transferring a sheet including the conductive metal on the body 110, or may be formed by transferring the sheet including the conductive metal on the sintered electrode.

The conductive metal used for the electrode layers 131a and 132a is not particularly limited as long as it is a material that may be electrically connected to the internal electrode(s) to form capacitance. For example, the conductive metal may be one or more of nickel (Ni), copper (Cu), palladium (Pd), silver (Ag), gold (Au), platinum (Pt), tin (Sn), tungsten (W), titanium (Ti), and alloys thereof.

The plating layers 131b and 132b may be plating layers including at least one of nickel (Ni), tin (Sn), palladium (Pd), and alloys thereof, and may include a plurality of layers.

As a more specific example of the plating layers 131b and 132b, the plating layers 131b and 132b may be nickel (Ni) plating layers or tin (Sn) plating layers, may have a form in which the nickel (Ni) plating layers and the tin (Sn) plating layers are sequentially formed on the electrode layers 131a and 132a, and may have a form in which a tin (Sn) plating layer, a nickel (Ni) plating layer, and another tin (Sn) plating layer are formed sequentially. In addition, the plating layers 131b and 132b may include a plurality of nickel (Ni) plating layers and/or a plurality of tin (Sn) plating layers.

Method of Manufacturing Ceramic Electronic Component

Hereinafter, a method of manufacturing a ceramic electronic component according to another aspect of the present disclosure will be described in detail. However, descriptions overlapping those described in the ceramic electronic component will be omitted to avoid overlapping descriptions.

According to another aspect of the present disclosure, a method of manufacturing a ceramic electronic component includes preparing a base material powder having a core-shell structure having a core and a shell, the shell including a rare earth element R1, adding a minor component including another type of rare earth element R2, different from the rare earth element R1, to the base material powder to prepare a ceramic green sheet, printing a conductive paste for an internal electrode on the ceramic green sheet, and then laminating the printed ceramic green sheet to prepare a laminate, sintering the laminate to prepare a body including a dielectric layer and an internal electrode, and forming an external electrode on the body. A content of R2 in the base material powder is 0.1 to 3.0 times a content of R1.

A base material powder, having a core-shell structure having a core and a shell, the shell including a rare earth element, may be prepared.

When the base material powder does not have the core-shell structure, it may be difficult to implement dielectric grains having a core-dual shell structure according to the present disclosure.

The method of manufacturing the base material powder having the core-shell structure is not necessarily limited. For example, when $BaTiO_3$ is prepared by a hydrothermal synthesis process, a rare earth element may be added, during a process of growing the powder to a desired size, to synthesize the base material powder. Alternatively, after mixing the $BaTiO_3$ with the rare earth element, the base material powder having the core-shell structure may be prepared through heat treatment.

Next, a minor component including a rare earth element R2, different from the rare earth element R1, may be added to the base material powder to prepare a ceramic green sheet. In this case, after adding the minor component to the base material powder, ethanol and toluene as a solvent may be mixed with a dispersant, and a binder may be further mixed therewith to produce a ceramic sheet.

To implement dielectric grains having a core-dual shell structure according to the present disclosure, a content of the rare earth element R2 included in the base material powder as a minor component may be controlled to be 0.1 to 3.0 times a content of the rare earth element R1 included in the base material powder.

When the content of R2 is less than 0.1 times the content of R1 included in the base material powder, it may be difficult to implement dielectric grains having a core-dual shell structure according to the present disclosure. When the content of R2 is greater than 3.0 times the content of R1 included in the base material powder, a secondary phase may be formed by a rare earth element to deteriorate reliability.

Elements included in the minor component, except for the rare earth element, are not necessarily limited and may be appropriately controlled to obtain desired characteristics.

Next, after printing an electrically conductive paste for internal electrodes on the ceramic sheet, a plurality of printed ceramic sheets may be laminated to prepare a laminate.

Next, the laminate may be sintered to prepare a body including dielectric layer(s) and internal electrode(s).

The dielectric layer 111 includes a plurality of dielectric grains 10a, 10b, and 10c. At least one of the plurality of dielectric grains 10a, 10b, and 10c has a core-dual shell structure having a core C and a dual shell. The dual shell includes a first shell S1, surrounding at least a portion of the core C, and a second shell S2 surrounding at least a portion of the first shell S1. The dual shell includes at least two different types of rare earth elements R1 and R2, and $R2_{S1}/R1_{S1}$ is 0.01 or less and $R2_{S2}/R1_{S1}$ is 0.5 to 3.0, where $R1_{S1}$ and $R1_{S2}$ denote concentrations of R1 included in the first shell and the second shell, respectively, and $R2_{S1}$ and $R2_{S2}$ denote concentrations of R2 included in the first shell and the second shell, respectively.

To satisfy the above relationship in which $R2_{S1}/R1_{S1}$ is 0.01 or less and $R2_{S2}/R1_{S1}$ is 0.5 to 3.0, a sintering temperature as well as contents of rare earth elements, added to the base material powder as the minor components, needs to be appropriately adjusted.

A specific numerical range of the sintering temperature may vary depending on types and amounts of added elements, but is not necessarily limited. For example, the range of the sintering temperature may be more than 1230° C. to less than 1280° C.

Next, an external electrode may be formed on the body to obtain a ceramic electronic component.

Example

Base material powders, listed in Table 1 below, were prepared. In this case, "1.5Y doped BT" refers to a base material powder, having a core-shell structure, in which 1.5 mole of Y is included in a shell portion, relative to 100 moles of $BaTiO_3$. In addition, "0.5Ho doped BT" refers to a base material powder, having a core-shell structure, in which 0.5 mole of Ho is included in a shell portion, relative to 100 moles of $BaTiO_3$. In addition, "Non doped BT" refers to a $BaTiO_3$ powder having no core-shell structure.

Then, minor components, listed in Table 1 below, were added to the base material power and mixed with a dispersant using ethanol and toluene as a solvent. Then, a binder was further mixed therewith to prepare a ceramic sheet. A nickel (Ni) electrode was printed on the prepared ceramic sheet, and a plurality of printed ceramic sheets were laminated, pressed, and cut to prepare a plurality of chips. The plurality of chips were plasticized to remove the binder, and a sintering operation was then performed under a reducing atmosphere at a sintering temperatures, listed in Table 1, to prepare sample chips.

Dielectric constants, 125° C. TCC values, and high-temperature lifespan characteristics of the prepared sample chips were measured and are listed in Table 2 below.

In each of the listed samples, a structure of a dielectric grain was analyzed through TEM-EDS analysis and is listed in Table 2.

The 125° C. TCC values were measured using an LCR meter at a temperature range of −55° C. to 125° C. at 1 kHz and 1 V.

Tests for high-temperature lifespan characteristics (high-temperature IR boosting tests) were performed on 40 samples for each test number by maintaining conditions including 150° C. and 1 Vr=10 V/μm for 30 minutes, increasing voltages in times, and calculating an averaged of failure voltage values, and the calculated average values are listed. In this case, "1 Vr" refers to 1 reference voltage, and "10 V/μm" refers to a voltage of 10 volts per 1 μm, a thickness of a dielectric substance.

In addition, cross-sections of the sample chips in length and thickness directions (L-T cross-sections), cut in a central portion of each of the sample chips in the width direction, were analyzed by a transmission electron microscope (TEM) and an energy dispersive X-ray spectroscopy (EDS) apparatus to list Concentrations 1*, Concentrations 2* Lengths*, and Fractions* in Table 2. The TEM was 200 kV ARM, and was confirmed with spot 4, 100,000 times. STEM-EDS was measured with 100 points at intervals of 10 nm.

Concentrations 1* and Concentrations 2* were determined by performing line analysis of an energy dispersive X-ray spectroscopy (EDS), mounted on a transmission electron microscope (TEM), on grains each having a core-dual shell structure to obtain an intensity value for each of Y and Dy. Concentrations 1* were obtained by dividing a value $R1_{S2}$, obtained by subtracting the intensity of Y in a core region from the intensity of Y in a second shell, by a value $R1_{S1}$ obtained by subtracting the Y intensity of the core region from the intensity of Y in a first shell. Concentrations 2* were obtained by dividing a value $R2_{S2}$, obtained by subtracting the intensity of Dy in the core region from the intensity of Dy in the second shell, by a value $R1_{S1}$ obtained by subtracting the intensity of Y in the core region from the intensity of Y in the first shell.

Figure 7:
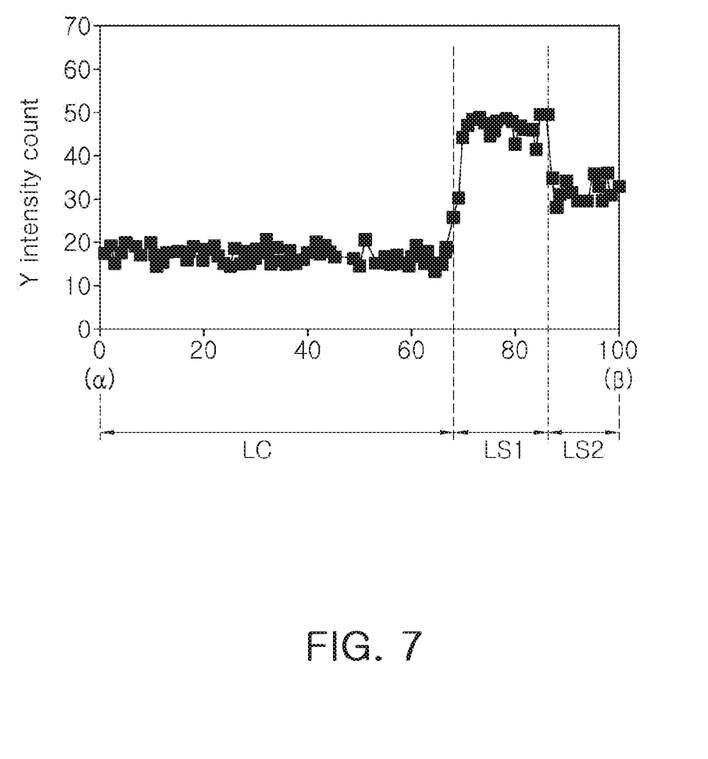
FIG. 7 illustrates intensities of Y measured as results of X-ray fluorescence (XRF) Energy Dispersive Endoscopy (EDS) line analysis for grains having a core-dual shell structure of the Inventive Example of Test No. 2.
Figure 8:
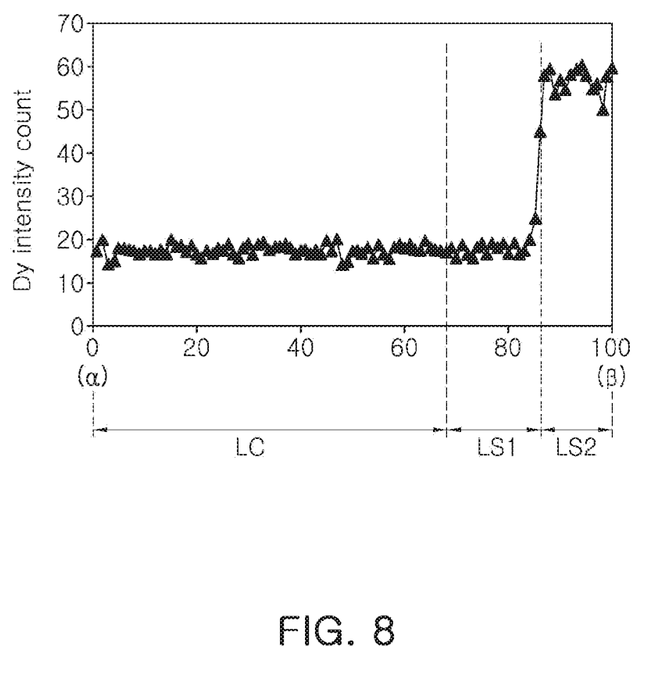
FIG. 8 illustrates intensities of Dy measured as results of XRF EDS line analysis for grains having a core-dual shell structure of the Inventive Example of Test No. 2.

Lengths* were obtained by performing TEM EDS line analysis on the grains, each having a core-dual shell structure as illustrated in FIGS. 7 and 8, and results of [the number of points measured in the LS2]/[the total number of points measured from α to β] are listed.

Fractions* were obtained by measuring ratios of the number of grains each having a core-dual shell structure, relative to the total number of dielectric grains in the 10 μm×10 μm regions, central portions of the cross-sections in the length and thickness directions (L-T cross-sections).

TABLE 1

| Test Nos. | Base Material Power | Minor Components (Moles relative to BT 100 moles of Base Material Powders) | Sintering Temp. (° C.) |
|---|---|---|---|
| 1* | 1.5Y doped BT | Dy 1.0, Mn 0.2, Cr 0.1, Ba 2.5, Si 2.5, Al 0.5, Mg 0.8, Zr 0.45 | 1230 |
| 2 | | Dy 1.0, Mn 0.2, Cr 0.1, Ba 2.5, Si 2.5, Al 0.5, Mg 0.8, Zr 0.45 | 1250 |
| 3 | | Dy 2.0, Mn 0.2, Cr 0.1, Ba 2.5, Si 2.5, Al 0.5, Mg 0.8, Zr 0.45 | 1250 |
| 4 | | Dy 0.3, Mn 0.2, Cr 0.1, Ba 2.5, Si 2.5, Al 0.5, Mg 0.8, Zr 0.45 | 1250 |
| 5* | | Dy 0.1, Mn 0.2, Cr 0.1, Ba 2.5, Si 2.5, Al 0.5, Mg 0.8, Zr 0.45 | 1250 |
| 6* | | Dy 0.0, Mn 0.2, Cr 0.1, Ba 2.5, Si 2.5, Al 0.5, Mg 0.8, Zr 0.45 | 1250 |
| 7* | 0.7Ho doped BT | Dy 1.0, Mn 0.15, Ba 2.1, Si 2.2, Al 0.8 Mg 1.0, Zr 0.35 | 1220 |
| 8 | | Dy 1.0, Mn 0.15, Ba 2.1, Si 2.2, Al 0.8 Mg 1.0, Zr 0.35 | 1240 |
| 9 | | Dy 1.0, Mn 0.15, Ba 2.1, Si 2.2, Al 0.8 Mg 1.0, Zr 0.35 | 1260 |
| 10* | | Dy 1.0, Mn 0.15, Ba 2.1, Si 2.2, Al 0.8 Mg 1.0, Zr 0.35 | 1280 |
| 11* | Non doped BT | Y1.5, Dy 1.0, Mn 0.2, Cr 0.1, Ba 2.5, Si 2.5, Al 0.5, Mg 0.8, Zr 0.45 | 1250 |
| 12* | | Ho0.7, Dy 1.0, Mn 0.15, Ba 2.1, Si 2.2, Al 0.8, Mg 1.0, Zr 0.35 | 1240 |

TABLE 2

| Test Nos. | DC | 125° C. TCC | High Temp. Lifespan Characteristics (V/μm) | C1* (R1$_{S2}$/R1$_{S1}$) | C2* (R2$_{S2}$/R1$_{S1}$) | L | F* | Note |
|---|---|---|---|---|---|---|---|---|
| 1* | 2200 | −7% | 21 | 0.8 | 4.00 | 4/100 | 23% | CE |
| 2 | 2400 | −8% | 78 | 0.5 | 1.20 | 5/100 | 55% | IE |
| 3 | 2000 | −3% | 75 | 1.3 | 3.00 | 13/100 | 82% | IE |
| 4 | 2600 | −10% | 73 | 0.1 | 0.50 | 15/100 | 75% | CE |
| 5* | 3200 | −19% | 31 | 0.05 | 0.20 | 30/100 | 57% | CE |
| 6* | 3700 | −25% | 26 | 0.05 | — | 30/100 | 52% | CE |
| 7* | 2500 | −9% | 29 | 1.0 | 1.80 | 4/100 | 48% | CE |
| 8 | 2700 | −12% | 62 | 0.8 | 1.20 | 18/100 | 78% | IE |
| 9 | 2800 | −14% | 73 | 0.5 | 1.00 | 20/100 | 75% | IE |
| 10* | 3400 | −23% | 13 | 0.1 | 0.80 | 15/100 | 64% | CE |
| 11* | 2400 | −9% | 53 | — | — | — | — | CE |
| 12* | 2900 | −15% | 50 | — | — | — | — | CE |

As can seen from Tables 1 and 2, Test Nos. 2 to 4, 8, and 9, in which Concentration 2* satisfied 0.5 to 3.0, had an improved high-temperature lifespan reliability. In addition, Test Nos. 2 to 4, 8, and 9 had an improved dielectric constant and improved 125° C. TCC characteristics.

Meanwhile, Test Nos. 11 and 12, in which no grain having a core-dual shell structure is included, had poor high-temperature lifespan reliability.

In addition, Test Nos. 1, 5 and 6 had a core-dual shell structure, but a value of Concentration 2* (R2$_{S2}$/R1$_{S1}$) did not satisfy 0.5 to 3.0, and thus, high-temperature lifespan reliability was poor.

In the case of Test No. 7, a value of Concentration 2* (R2$_{S2}$/R1$_{S1}$) satisfied 0.5 to 3.0, but a second shell had a significantly short length or a fraction of a grain having a core-dual shell structure was low, and thus, high-temperature lifespan reliability was poor.

In the case of Test No. 10, a value of Concentration 2* (R2$_{S2}$/R1$_{S1}$) satisfied 0.5 to 3.0, but a value of Concentration 1* (R1$_{S2}$/R1$_{S1}$) was low, and thus, high-temperature lifespan reliability was poor.

FIG. 7 illustrates intensities of Y measured as results of XRF EDS line analysis for grains having a core-dual shell structure of the Inventive Example of Test No. 2.

In FIG. 7, intensity of Y in a core portion is approximately 18 on average, which indicates that Y is not present in the core portion. In addition, intensity of Y and a length LC corresponding to a radius of the core portion may vary depending on a TEM apparatus, measurement conditions, and environments, but a portion having a lowest value in the measured intensity may be regarded as a core region and may be regarded as a portion in which Y is not present.

The intensity of Y in the first shell S1 is approximately 48 on average, and the intensity of Y in the second shell S2 is approximately 33 on average. Therefore, R1$_{S2}$/R1$_{S1}$ may be obtained by dividing a value, obtained by subtracting 18 from the intensity of Y in the second shell, by a value obtained by subtracting 18 from the intensity of Y in the first shell. For example, R1$_{S2}$/R1$_{S1}$=(33−18)/(48−18)=0.5.

FIG. 8 illustrates intensities of Dy measured as results of XRF EDS line analysis for grains having a core-dual shell structure of the Inventive Example of Test No. 2.

In FIG. 8, intensity of Dy in a core portion and a first shell is approximately 18 on average, which indicates that Dy is not present in the core portion and the first shell. In addition, intensity of Dy to a length LC corresponding to a radius of the core portion may vary depending on a TEM apparatus, measurement conditions, and environments, but a portion having a lowest value in the measured intensity may be regarded as a core region and may be regarded as a portion in which Dy is not present.

The intensity of Dy in a second shell S2 is approximately 54 on average. Therefore, R2$_{S2}$/R1$_{S1}$ may be obtained by dividing a value, obtained by subtracting 18 from the intensity of Dy in the second shell, by a value obtained by subtracting 18 from the intensity of Y in the first shell. For example, R2$_{S2}$/R1$_{S1}$=(54−18)/(48−18)=1.20.

As described above, among a plurality of dielectric grains, at least one grain may have a core-dual shell structure. Thus, reliability of a ceramic electronic component may be improved.

In the core-dual shell structure, a concentration of a rare earth element included in a first shell and a concentration of a rare earth element included in a second shell may be controlled to improve high-temperature lifespan characteristics and TCC characteristics.

While embodiments have been illustrated and described above, it will be apparent to those skilled in the art that modifications and variations could be made without departing from the scope of the present disclosure as defined by the appended claims.

What is claimed is:

1. A ceramic electronic component comprising:
   a body including a dielectric layer and an internal electrode; and
   an external electrode disposed on the body and connected to the internal electrode,
   wherein the dielectric layer includes a plurality of dielectric grains, wherein
      at least one of the plurality of dielectric grains has a core-dual shell structure having a core and a dual shell,
      the dual shell includes a first shell surrounding at least a portion of the core, and a second shell surrounding at least a portion of the first shell,
      the dual shell includes at least two different types of rare earth elements R1 and R2, and
      R2$_{S1}$/R1$_{S1}$ is 0.01 or less, and R2$_{S2}$/R1$_{S1}$ is 0.5 to 3.0, and R1$_{S2}$/R1$_{S1}$ is 0.1 to 1.3, where R1$_{S1}$ and R1$_{S2}$ denote concentrations of R1 included in the first shell and the second shell, respectively, and R2$_{S1}$ and R2$_{S2}$ denote concentrations of R2 included in the first shell and the second shell, respectively.

2. The ceramic electronic component of claim 1, wherein a distance corresponding to a thickness of the second shell along a straight line connecting α and β is greater than 4% to less than 25% of a distance between α and β, where α denotes a center of the core-dual shell structure in the cross-section of the core-dual shell structure, and β denotes a point on a surface of the second shell, farthest from α.

3. The ceramic electronic component of claim 2, wherein a distance corresponding to a thickness of the first shell along the straight line connecting α and β is 5% or more to 30% or less.

4. The ceramic electronic component of claim 2, wherein a distance corresponding to a thickness of the first shell along the straight line connecting α and β is 0.5 or more to 1.5 or less times the distance corresponding to a thickness of the second shell along the straight line connecting α and β.

5. The ceramic electronic component of claim 1, wherein the first shell of the core-dual shell structure is disposed to cover 90% or more of a surface area of the core, and the second shell of the core-dual shell structure is disposed to cover 90% or more of a surface area of the first shell.

6. The ceramic electronic component of claim 1, wherein at least one of the plurality of dielectric grains has a core-shell structure having the core and a shell.

7. The ceramic electronic component of claim 1, wherein a number of dielectric grains having the core-dual shell structure is 50% or more of a number of the plurality of dielectric grains.

8. The ceramic electronic component of claim 1, wherein the dielectric layer includes one or more of $BaTiO_3$, (Ba,Ca)(Ti,Ca)$O_3$, (Ba,Ca)(Ti,Zr)$O_3$, Ba(Ti,Zr)$O_3$, or (Ba,Ca)(Ti,Sn)$O_3$ as a main component.

9. The ceramic electronic component of claim 8, wherein a sum of contents of R1 and R2 included in the dielectric layer is 0.1 to 15 mole relative to 100 moles of the main component.

10. The ceramic electronic component of claim 8, wherein the dielectric layer further includes at least one of Mn, Cr, Ba, Si, Al, Mg, or Zr, as a minor component.

11. The ceramic electronic component of claim 8, wherein the dielectric layer includes one or more selected from the group consisting of $BaTiO_3$, $(Ba_{1-x}Ca_x)(Ti_{1-y}Ca_y)O_3$ (where $0 \le x \le 0.3$, $0 \le y \le 0.1$), $(Ba_{1-x}Ca_x)(Ti_{1-y}Zr_y)O_3$ (where $0 \le x \le 0.3$, $0 \le y \le 0.5$), $Ba(Ti_{1-y}Zr_y)O_3$ (where $0 < y \le 0.5$), or $(Ba_{1-x}Ca_x)(Ti_{1-y}Sn_y)O_3$ (where $0 \le x \le 0.3$, $0 \le y \le 0.1$).

12. The ceramic electronic component of claim 1, wherein R1 comprises at least one selected from the group consisting of lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Ru), and R2 comprises at least one selected from the group, other than the element included in R1.

13. The ceramic electronic component of claim 1, wherein R2 has a larger ionic radius than R1.

14. A ceramic electronic component comprising:
a body including a dielectric layer and an internal electrode; and
an external electrode disposed on the body and connected to the internal electrode,
wherein the dielectric layer includes a plurality of dielectric grains, wherein
at least one of the plurality of dielectric grains has a core-dual shell structure having a core and a dual shell,
the dual shell includes a first shell surrounding at least a portion of the core, and a second shell surrounding at least a portion of the first shell,
the dual shell includes at least two different types of rare earth elements R1 and R2, and
$R2_{S1}/R1_{S1}$ is 0.01 or less and $R2_{S2}/R1_{S1}$ is 0.5 to 3.0, where $R1_{S1}$ and $R1_{S2}$ denote concentrations of R1 included in the first shell and the second shell, respectively, and $R2_{S1}$ and $R2_{S2}$ denote concentrations of R2 included in the first shell and the second shell, respectively
wherein a distance corresponding to a thickness of the second shell along a straight line connecting α and β is greater than 4% to less than 25% of a distance between α and β, where α denotes a center of the core-dual shell structure in the cross-section of the core-dual shell structure, and β denotes a point on a surface of the second shell, farthest from α.

15. The ceramic electronic component of claim 14, wherein a distance corresponding to a thickness of the first shell along the straight line connecting α and β is 5% or more to 30% or less.

16. The ceramic electronic component of claim 14, wherein a distance corresponding to a thickness of the first shell along the straight line connecting α and β is 0.5 or more to 1.5 or less times the distance corresponding to a thickness of the second shell along the straight line connecting α and β.

* * * * *